United States Patent
Omeragic et al.

(10) Patent No.: US 8,433,518 B2
(45) Date of Patent: Apr. 30, 2013

(54) MULTILEVEL WORKFLOW METHOD TO EXTRACT RESISTIVITY ANISOTROPY DATA FROM 3D INDUCTION MEASUREMENTS

(75) Inventors: Dzevat Omeragic, Lexington, MA (US); Keli Sun, Sugar Land, TX (US); Qiming Li, Sugar Land, TX (US); Tarek Habashy, Burlington, MA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 199 days.

(21) Appl. No.: 12/888,232

(22) Filed: Sep. 22, 2010

(65) Prior Publication Data

US 2011/0231098 A1   Sep. 22, 2011

Related U.S. Application Data

(60) Provisional application No. 61/248,790, filed on Oct. 5, 2009, provisional application No. 61/326,287, filed on Apr. 21, 2010.

(51) Int. Cl.
*G01V 1/40* (2006.01)
*G01V 3/10* (2006.01)
*G06G 7/48* (2006.01)

(52) U.S. Cl.
USPC .................. 702/7; 324/339; 703/10

(58) Field of Classification Search .............. 702/7, 1–2, 702/6, 9–14, 16, 81, 84, 127, 182–183, 189; 324/323, 332–335, 337–339, 343–348, 354–357, 324/362, 366–369; 703/5, 10
See application file for complete search history.

(56) References Cited

U.S. PATENT DOCUMENTS

| | | | |
|---|---|---|---|
| 5,235,285 | A | 8/1993 | Clark et al. |
| 5,517,464 | A | 5/1996 | Lerner et al. |
| 6,163,155 | A | 12/2000 | Bittar |
| 6,594,584 | B1 | 7/2003 | Omeragic et al. |
| 6,969,994 | B2 | 11/2005 | Minerbo et al. |

(Continued)

FOREIGN PATENT DOCUMENTS

| | | |
|---|---|---|
| CN | 102031964 A | 4/2011 |
| EP | 2320251 A2 | 5/2011 |

OTHER PUBLICATIONS

Abubakar et al., An Enhanced Gauss-Newton Inversion Algorithm Using a Dual-Optimal Grid Approach, Jun. 2006, IEEE Transactions on GeoScience and Remote Sensing, vol. 44, No. 6, pp. 1419-1427.*

(Continued)

*Primary Examiner* — Toan Le
(74) *Attorney, Agent, or Firm* — Kenneth Liu; Darla Fonseca

(57) ABSTRACT

A method is provided for determining formation resistivity, anisotropy and dip from wellbore measurements includes moving a well logging instrument through subsurface formations. The instrument includes longitudinal magnetic dipoles and at least one of tilted and transverse magnetic dipoles. Formation layer boundaries and horizontal resistivities of the formation layers are determined from longitudinal magnetic dipole measurements. Vertical resistivities of the formation layers are determined by inversion of anisotropy sensitive measurements. Improved vertical resistivities of the formation layers and dips are determined by inverting symmetrized and anti-symmetrized measurements. Improved vertical resistivities, improved boundaries and improved dips are determined by inversion of the all dipole measurements. Improved horizontal resistivities, further improved layer boundaries and further improved dips are determined by inversion of all dipole measurements.

14 Claims, 12 Drawing Sheets

U.S. PATENT DOCUMENTS

| | | | |
|---|---|---|---|
| 6,998,844 | B2 | 2/2006 | Omeragic et al. |
| 7,040,415 | B2 | 5/2006 | Boyle et al. |
| 7,317,991 | B2 | 1/2008 | Wang et al. |
| 7,382,135 | B2 | 6/2008 | Li et al. |
| 7,536,261 | B2 | 5/2009 | Omeragic et al. |

OTHER PUBLICATIONS

Krieghauser et al., A New Multicomponent Induction Logging Tool to Resolve Anisotropic Formations, Jun. 4-7, 2000, SPWLA 41th Annual Logging Symposium, Paper D, 14 pp.*

Habashy et al., A General Framework for Constraint Minimization for the Inversion of Electromagnetic Measurements, 2004, Progress in Electromagnetics Research, PIER 46, pp. 265-312.*

Krieghauser et al., "A New Multicomponent Induction Tool to Resolve Anisotropic Formation," 41st Annual SPWLA Symposium, Paper D, Salt Lake City, UT (May 30-Jun. 3, 2000).

Rosthal et al., Field Tests of an Experimental fully Triaxial Induction Tool, SPWLA Annual Logging Symposium, Paper QQ, Galveston, TX (Jun. 22-25, 2003).

Wang et al., "Fast and Rigorous Inversion of Triaxial Induction Logging Data to Determine Formation Resistivity Anisotropy, Bed Boundary Position, Relative Dip and Azimuth Angles," SEG Annual Meeting, Dallas, TX (Oct. 27-30, 2003).

Bootie, R., Waugh, M., Bittar, M., Hveding, F., Hendricks, W. E. and Pancham, S., "Laminated SandShale Formation Evaluation Using Azimuthal LWD Resistivity", paper to be presented at 2009 ATCE, SPE Annual Technology Conference, New Orleans, LA, Oct. 4-7, 2009.

Li, Q., D. Omeragic, L. Chou, L. Yang, K. Duong, J. Smits, J. Yang, T. Lau, C. Liu, R. Dworak, V. Dreuillault, and H. Ye, "New directional electromagnetic tool for proactive geosteering and accurate formation evaluation while drilling," 46th SPWLA Annual Well Logging Symposium, Paper UU, 2005.

\* cited by examiner

FIG. 9A
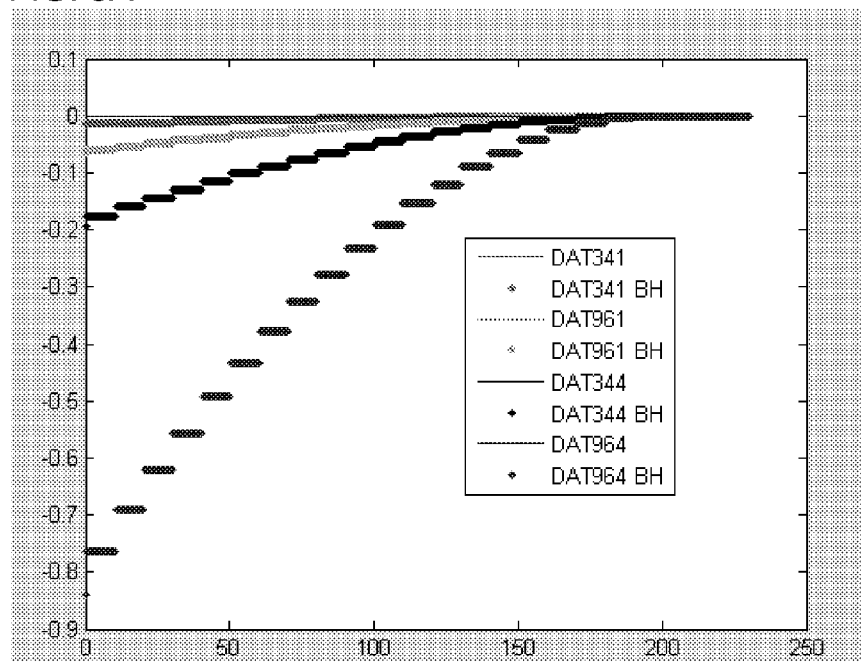
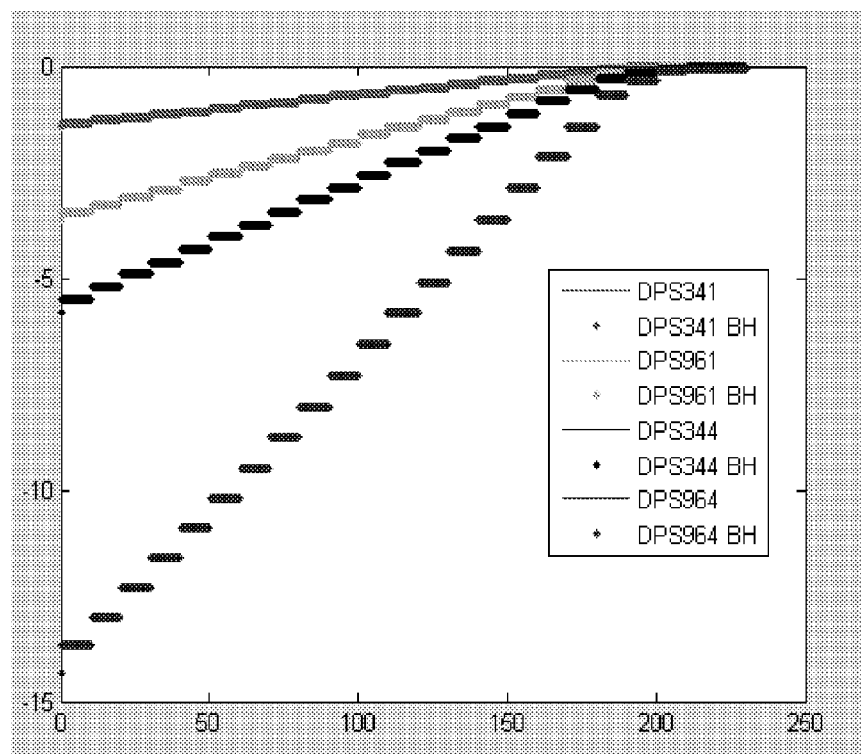
FIG. 9B

MULTILEVEL WORKFLOW METHOD TO EXTRACT RESISTIVITY ANISOTROPY DATA FROM 3D INDUCTION MEASUREMENTS

CROSS-REFERENCE TO RELATED APPLICATIONS

Priority is claimed form U.S. Provisional Application No. 61/248,790 filed Oct. 5, 2009 and U.S. Provisional Application No. 61/326,287 filed Apr. 21, 2010.

STATEMENT REGARDING FEDERALLY SPONSORED RESEARCH OR DEVELOPMENT

Not applicable.

BACKGROUND OF THE INVENTION

1. Field of the Invention

The invention relates generally to the field of electromagnetic measurements of rock formation resistivity made by instruments disposed in wellbores drilled through rock formations. More specifically, the invention relates to methods for determining resistivity, resistivity anisotropy and formation attitude (dip) using electromagnetic measurements of the rock formations.

2. Background Art

One of the major recent developments in well logging technology is the introduction of electromagnetic measurements with three dimensional (3D) sensitivities. In so called "wireline" measuring systems (i.e., those conveyed through wellbores at the end of an armored electrical cable), 3D electromagnetic induction measurements are designed primarily for detecting resistivity anisotropy in vertical wells (see, e.g., Krieghauser et al, *A New Multicomponent Induction Tool to Resolve Anisotropic Formation*, paper D presented at the 2000 41$^{st}$ Annual SPWLA Symposium, Salt Lake City, Utah, 30 May-3 June, and Rosthal, R., Barber, T., Bonner, S., Chen, K. C., Davydycheva, S., Hazen, G., Homan, D., Kibbe, S., Minerbo, G., Schlein, R., Villegas, Wang, W., and Zhou, *Field tests of an experimental fully triaxial induction tool*, presented at 2003 SPWLA Annual Logging Symposium, June 22-25, Galveston, Tex., paper QQ.

Logging-while-drilling ("LWD") measurements made by well logging instruments such as one identified by the trademark PERISCOPE, which is a trademark of the assignee of the present invention, represent an LWD counterpart of multi-axial wireline induction instruments. LWD instruments are typically conveyed through wellbores during drilling or during "tripping" of drill pipe or other pipe through a wellbore. The foregoing PERISCOPE LWD instruments are typically used for well placement within selected subsurface rock formations or reservoir portions of such formations. However the full potential of these multi-axial LWD measurements for quantitative formation evaluation, especially for evaluation of formation resistivity anisotropy at all apparent dip angles, has not heretofore been used.

Interpretation of wireline 3D induction measurements is based on one dimensional parametric inversion. See, e.g., Wang, H., Barber, T., Rosthal, R., Tabanou, J., Anderson, B., and Habashy, T., *Fast and rigorous inversion of triaxial induction logging data to determine formation resistivity anisotropy, bed boundary position, relative dip and azimuth angles*, presented at the 2003 SEG Annual Meeting, October 27-30, Dallas, Tex. However, there is no such inversion procedure available for multi-axial LWD measurements, where ideally the resistivity anisotropy interpretation would be done essentially in real-time during the drilling of the wellbore.

U.S. Pat. No. 6,998,844, issued to Omeragic et al and assigned to the assignee of the present invention, describes making electromagnetic propagation measurements using transverse and tilted magnetic dipole antennas ("transverse" and "tilted" in the present context means with reference to the longitudinal axis of the well logging instrument). Such antennas are used in the PERISCOPE instrument described above. The '844 patent also describes a method for removing the "invasion" effect (effect of change in resistivity of formations proximate the wellbore wall by displacement of native fluid in the pore spaces with liquid phase of the drilling fluid) and shoulder-bed effect (effects of axially adjacent formations to the one under evaluation) from the anisotropy measurement, based on model-based parametric inversion. U.S. Pat. No. 6,594,584, issued to Omeragic et al and also assigned to the assignee of the present invention discloses a distance-to boundary parametric inversion that includes anisotropy inversion from an interval (longitudinally along the wellbore) of electromagnetic measurement data.

There continues to be a need for determination of formation resistivity, resistivity anisotropy and formation bedding attitude ("dip") from electromagnetic measurements made during the drilling of a wellbore.

SUMMARY OF THE INVENTION

A method for determining formation resistivity, anisotropy and dip from wellbore measurements according to one aspect of the invention includes moving a well logging instrument through subsurface formations. The instrument includes electromagnetic transmitters and receivers oriented as longitudinal magnetic dipoles and at least one of tilted magnetic dipoles and transverse magnetic dipoles. The transmitters and receivers are used to make corresponding dipole sensitive measurements. Formation layer boundaries and horizontal resistivities of the formation layers are determined from the longitudinal magnetic dipole measurements. Vertical resistivities of the formation layers are determined by inversion of anisotropy sensitive electromagnetic measurements. Improved vertical resistivities of the formation layers and dips thereof are determined by inverting symmetrized and anti-symmetrized electromagnetic measurements. Improved vertical resistivities, improved layer boundaries and improved dips are determined by inversion of the longitudinal magnetic dipole, anisotropy sensitive, symmetrized and anti-symmetrized measurements. Improved horizontal resistivities, further improved layer boundaries and further improved dips are determined by inversion of the longitudinal magnetic dipole, anisotropy sensitive, symmetrized and anti-symmetrized measurements.

Other aspects and advantages of the invention will be apparent from the following description and the appended claims.

BRIEF DESCRIPTION OF THE DRAWINGS

FIGS. 9A through 9D show comparison of tool responses, with and without borehole effect.

DETAILED DESCRIPTION

Figure 1A:
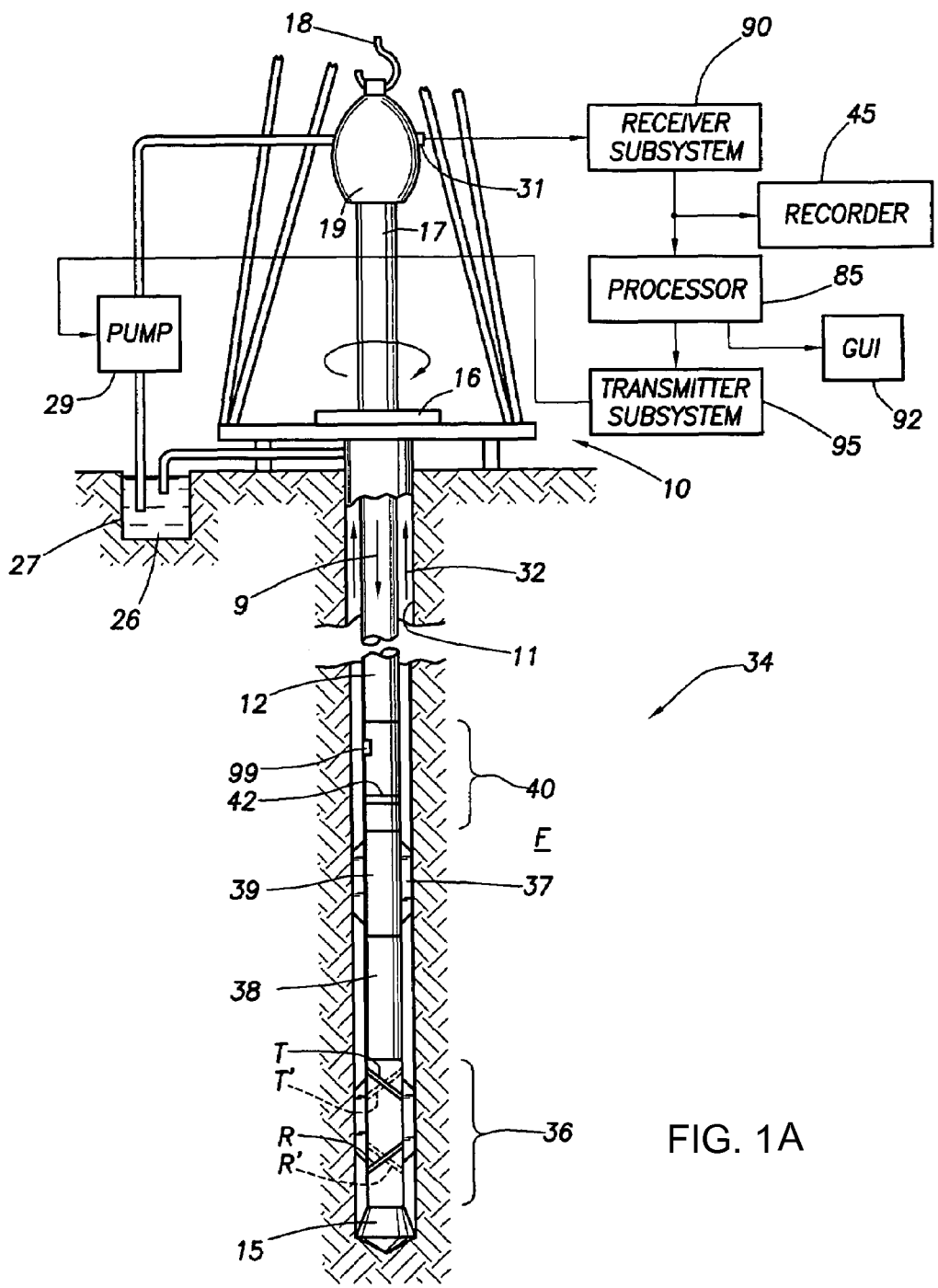
FIG. 1A shows a logging while drilling instrument that can make measurements usable with the invention.

FIG. 1A illustrates a drilling rig and drill string in which the measurements used with methods of the present invention can be made. A land-based platform and derrick assembly 10 are positioned over a wellbore 11 drilled through subsurface formations F. In the illustrated example, the wellbore 11 is formed by rotary drilling in a manner that is known in the art. Those skilled in the art will appreciate, however, that the present invention also finds application in directional drilling applications using hydraulically operated drill motors as well as rotary drilling. Furthermore, use of the invention is no way limited to use on land-based rigs.

A drill string 12 is suspended within the wellbore 11 and includes a drill bit 15 at its lower end. The drill string 12 is rotated by a rotary table 16, energized by means not shown, which engages a kelly 17 at the upper end of the drill string. The drill string 12 is suspended from a hook 18, attached to a traveling block (also not shown), through the kelly 17 and a rotary swivel 19 which permits rotation of the drill string relative to the hook.

Drilling fluid or mud 26 is stored in a pit 27 formed at the well site. A pump 29 delivers the drilling fluid 26 to the interior of the drill string 12 via a port in the swivel 19, inducing the drilling fluid to flow downwardly through the drill string 12 as indicated by the directional arrow 9. The drilling fluid exits the drill string 12 via ports in the drill bit 15, and then circulates upwardly through the region between the outside of the drill string and the wall of the wellbore, called the annulus, as indicated by the direction arrows 32. In this manner, the drilling fluid lubricates the drill bit 15 and carries formation cuttings up to the surface as it is returned to the pit 27 for recirculation.

The drill string 12 further includes a bottomhole assembly, generally shown at 34 near the drill bit 15 (typically within several drill collar lengths from the drill bit). The bottomhole assembly 34 may include capabilities for measuring, processing, and storing information, as well as communicating with the surface. The bottomhole assembly ("BHA") 34 thus includes, among other things, a measuring and local communications apparatus 36 for determining and communicating the resistivity of the formation F surrounding the wellbore 11. The communications apparatus 36, which includes an azimuthally sensitive resistivity measuring instrument, includes a first pair of transmitting/receiving antennas T, R, as well as a second pair of transmitting/receiving antennas T", R". The second pair of antennas T", R" is symmetric with respect to the first pair of antennas T, R. The resistivity instrument 36 further includes a controller to control the acquisition of data, as is known in the art. The resistivity instrument may be one described more fully in U.S. Pat. No. 7,382,135 issued to Li et al. and assigned to the assignee of the present invention. The foregoing instrument is used under the trademarks PERISCOPE 15 and PERISCOPE 100, which are trademarks of the assignee of the present invention. The PERISCOPE instruments have tilted dipole antennas. Types of interpretation of measurements from such tilted dipole antennas is described more fully in the Omeragic et al. '584 patent referred to above. For purposes of making measurements usable with methods according to the invention, it is only necessary to have any combination of electromagnetic antennas with dipole moments oriented to be sensitive: (i) primarily to "horizontal resistivity" (Rh), which is electrical resistivity of a rock formation measured parallel to the attitude of the formation layer ("bedding plane"); (ii) primarily to "vertical resistivity" (Rv) or resistivity anisotropy, which is electrical resistivity measured perpendicularly to the bedding plane, and (iii) be able to make or synthesize "symmetric" and "anti-symmetric" cross dipole measurements (such measurements are sensitive to the direction and magnitude of formation dip or bedding plane attitude with respect to the wellbore/instrument longitudinal axis).

The BHA 34 further includes instruments housed within drill collars 38, 39 for performing various other measurement functions, such as measurement of the natural radiation, density (gamma ray or neutron), and pore pressure of the formation F. At least some of the drill collars are equipped with stabilizers 37, as are well known in the art.

A surface/local communications subassembly 40 is also included in the BHA 34, just above the drill collar 39. The subassembly 40 includes a toroidal antenna 42 used for local communication with the resistivity tool 36 (although other known local-communication means may be employed to advantage), and a known type of acoustic telemetry system that communicates with a similar system (not shown) at the earth's surface via signals carried in the drilling fluid or mud. Thus, the telemetry system in the subassembly 40 includes an acoustic transmitter that generates an acoustic signal in the drilling fluid (a.k.a., "mud-pulse") that is representative of measured downhole parameters. Such telemetry, and related telemetry techniques that impart acoustic signals in the drilling fluid may be generally characterized as modulating the flow of fluid in the drill string or pipe string.

The generated acoustical signal is received at the surface by transducers represented by reference numeral 31. The transducers, for example, piezoelectric transducers, convert the received acoustical signals to electronic signals. The output of the transducers 31 is coupled to an uphole receiving subsystem 90, which demodulates the transmitted signals. The output of the receiving subsystem 90 is then coupled to a computer processor 85 and a recorder 45. The processor 85 may be used to determine the formation resistivity profile (among other things) on a "real time" basis while logging or subsequently by accessing the recorded data from the recorder 45. The computer processor is coupled to a monitor 92 that employs a graphical user interface ("GUI") through which the measured downhole parameters and particular results derived therefrom (e.g., resistivity profiles) are graphically presented to a user.

An uphole transmitting system 95 is also provided for receiving input commands from the user (e.g., via the GUI in monitor 92), and is operative to selectively interrupt the operation of the pump 29 in a manner that is detectable by transducers 99 in the subassembly 40. In this manner, there is two-way communication between the subassembly 40 and the uphole equipment. A suitable subassembly 40 is described in greater detail in U.S. Pat. Nos. 5,235,285 and 5,517,464, both of which are assigned to the assignee of the present invention. Those skilled in the art will appreciate that alternative acoustic techniques, as well as other telemetry means (e.g., electromechanical, electromagnetic), can be employed for communication with the surface.

In one example of such alternative signal telemetry, the drill string 12 may be substituted by a "wired" pipe string, which includes a wired signal telemetry channel forming part of each pipe segment, and an electromagnetic coupler disposed on a thread shoulder at each longitudinal end of each pipe segment. See, for example, U.S. Pat. No. 7,040,415 issued to Boyle et al. and assigned to the assignee of the present invention, the entirety of which is hereby incorporated by reference. Referring to FIG. 1A of U.S. Pat. No. 7,040,415, an example of such telemetry system may include the following. The drill string 6 that employs a telemetry system 100 in accordance with the present example includes a plurality of interconnected tubular members (described further below) suspended from a derrick and platform assembly 10 by way of a traveling block (not shown) and a hook 18. The upper end of the drill string 6 is defined by a kelly joint 17, the uppermost tubular member in the string, which is engaged by a conventional torque-applying means including a rotary table 16 for rotating the kelly joint as well as the entire drill string 6. A swivel 19 connects the hook 18 to the kelly joint 17, and permits rotation of the kelly joint and the drill string 6 relative to the hook.

Referring still to FIG. 1A of U.S. Pat. No. 7,040,415, the lower end of the drill string 6 may include a drill bit 15 which drills through the formation F to create the wellbore 7 as explained above. The drill bit is connected for rotation with the drill string 6 in a rotary drilling configuration of the sort described above.

The drill string 6 as explained above may otherwise employ a "top-drive" configuration wherein a power swivel rotates the drill string instead of a kelly joint and rotary table. Those skilled in the art will also appreciate that "sliding" drilling operations may otherwise be conducted with the use of a well known Moineau-type mud motor that converts hydraulic energy from the drilling mud pumped from a mud pit down through the drill string 106 into torque for rotating a drill bit. Drilling may furthermore be conducted with so-called "rotary-steerable" systems which are known in the related art. The various aspects of the present invention are adapted to each of these configurations and are not limited to conventional rotary drilling operations, although such equipment and methods will be described herein for illustrative purposes. The drill string telemetry system 100 can include a cabled communication link 5b having at least two spaced apart adapter subs (e.g., 9a, 9b, 9c) within the drill string 6 and a cable 112 (see FIGS. 1B and 1C of U.S Pat. No. 7,040,415) connecting the two adapter subs 9a, 9b for communication of a signal therebetween. The cabled communication link 5b can include a communicative coupler permitting the adapter subs to also serve as a component in a piped communication link 5a. Referring collectively to FIG. 1A of U.S. Pat. No. 7,040, 415 and to FIG. 1A of the present application, measurements from the well logging instrument 34 may be communicated to the surface unit 2 (including a recording unit 45) over the signal channel in the drill string 6 using a cable 3 connected to the swivel 19. The foregoing example, just as the example explained with reference to FIG. 1A of the present application, is only intended to illustrate the principle of communication between the BHA 36 (including the well logging instrument 34 shown in FIG. 1) and the recording unit 45 and is not intended to limit the scope of telemetry devices that may be used in accordance with the invention.

In methods according to the invention, measurements made from instruments such as those described above are processed to determine horizontal resistivity (apparent resistivity measured transversely to the thickness of a formation layer), vertical resistivity (resistivity measured along the direction of the thickness of a formation layer) and dip (attitude of the layers with respect to a selected axial reference).

The 1-D parametric inversion used to interpret wireline triaxial induction measurements is based on a "layer-cake" (substantially planar, parallel bedded formations) transversely isotropic (TI) formation model. Using a similar basis for layered rock formation models, and using measurements made by instruments such as the ones described above with reference to FIG. 1A, an inversion procedure according to the present invention may determine horizontal and vertical resistivity, Rh and Rv, respectively, formation dip (direction and magnitude) and thicknesses of all formation layers traversed by the well logging instrument. Methods according to the invention take advantage of the fact that different measurements made by the instrument are predominantly sensitive to different formation model parameters. A multi-step inversion procedure according to the invention typically includes the following general steps, which will be individually explained further below.

(1) Determine initial axial positions of formation layer ("bed") boundaries from conventional resistivity (that is, resistivity measured using longitudinal magnetic dipole antennas or galvanic devices) or directional responses from measurements made by instruments such as the PERISCOPE instrument described above.

(2) From conventional (e.g., longitudinal magnetic dipole) resistivity measurements, invert for horizontal resistivity Rh. In this step it is assumed that the formation is isotropic, i.e., Rv=Rh, and the layer (bed) thicknesses and dip are known.

(3) Invert for vertical resistivity (Rv) using "anisotropy" measurements. Such anisotropy measurements may be transverse or tilted magnetic dipole measurements.

(4) Invert for Rv and dip using symmetrized and anti-symmetrized measurements. As explained above, such measurements may be made from certain triaxial induction cross-dipole measurements or may be synthesized from the tilted dipole measurements made using the PERISCOPE instrument described above.

(5) Invert for Rv, dip and bed thicknesses (or bed boundary locations) using all available measurements.

(6) Invert for Rh, Dip and bed thicknesses (or bed boundary locations) using all available measurements.

(7) Examine the misfit between the measurement and the modeled response in step (6). If needed, perturb the solution to the inversion of step (6) to generate a new inversion model, and then repeat steps (5) and (6). Repeat steps (7), (5) and (6) until the misfit (in step 7) falls below a selected threshold. The result at that time will be the final model of the formations.

It will be noted that each of the above general steps (1) through (6) is itself an inversion procedure. The results of each individual inversion step (1) through (6) may be used as the initial model for each subsequent inversion step in the above procedure.

Figures 1B, 1C:
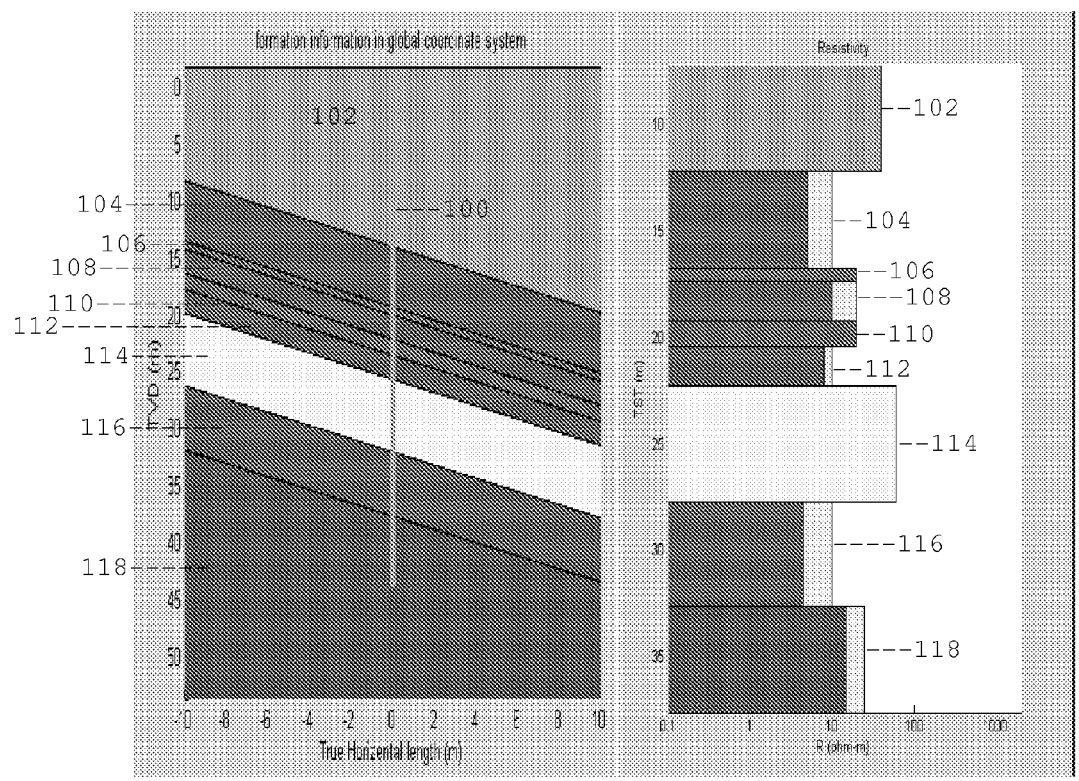
FIG. 1B shows geologic structure of a 1-D formation model.
FIG. 1C shows resistivities of the 1-D model of FIG. 1A
Figure 7:
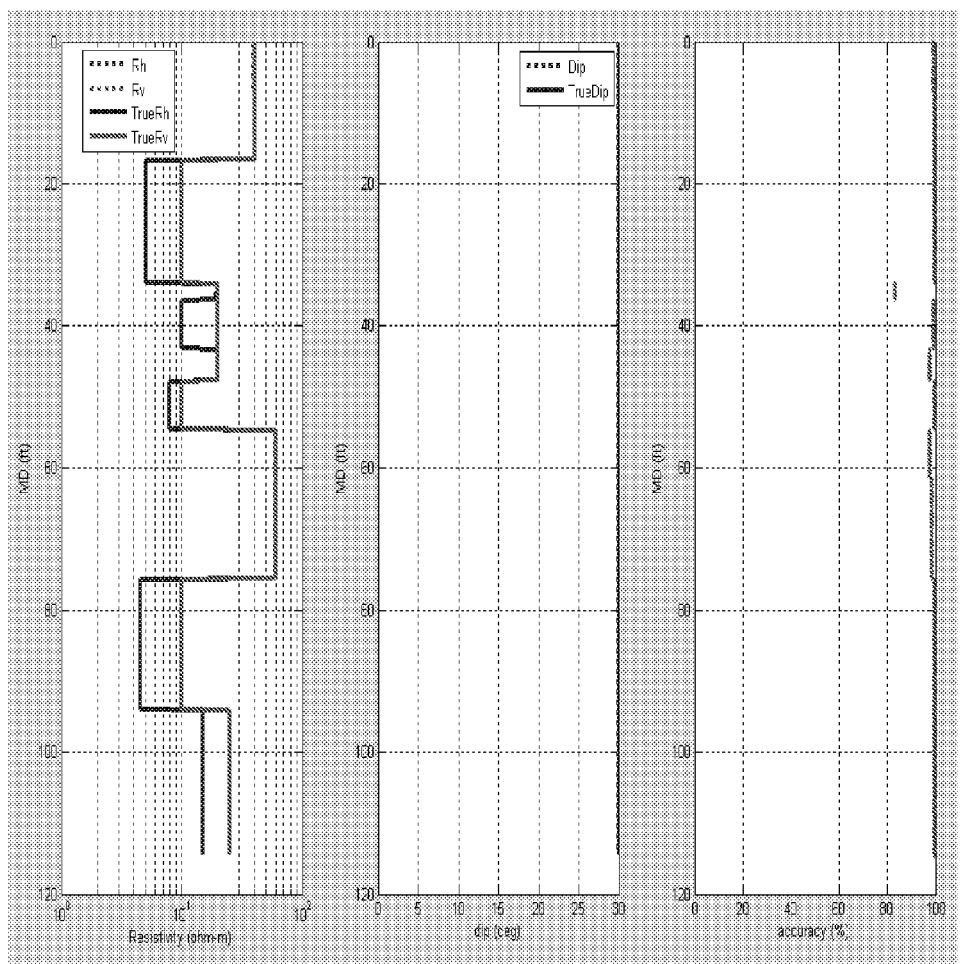
FIG. 7 shows confidence level calculations.

FIG. 1B shows a 1-D formation model having dipping formations, shown at 102-118. The synthetic response of a well logging instrument disposed in a simulated vertical well 100 penetrating such formations 102-118 was generated, and the synthetic response was used to perform an inversion, the results of which are shown in FIG. 7. As will be readily appreciated by those skilled in the art, "dip" calculated using methods according to the present invention represents the attitude of the formation layers with respect to the axis of the wellbore and/or well logging instrument. In cases where the wellbore is in fact geodetically vertical, the determined dip will represent the geodetic dip. In cases where the wellbore trajectory is not vertical, the determined dip may be converted to geodetic dip by adjusting for the wellbore geodetic trajectory. Such trajectory is typically measured substantially along the entire wellbore using directional sensors (e.g., a combination of triaxial magnetometer and triaxial accelerometer). The steps set forth above in an example method according to the invention will be explained in more detail below.

1. Obtaining the Initial Estimate of Bed Boundary Positions from Resistivity Responses General procedures for estimating initial formation layer ("bed") boundary positions from resistivity measurements include selecting a resistivity response (R). In one example, the response R may be obtained using the PERISCOPE instrument described above or any longitudinal magnetic dipole electromagnetic instrument and selecting one of the resistivity response curves, for example, phase shift. The logarithm thereof, log(R), is then calculated. Then, the derivative of log(R) with respect to axial position (measured depth) may be calculated. The peaks on the derivative curve may be selected as the bed boundaries.

Next, bed thicknesses are examined. If the thinnest bed is below a predefined cutoff or threshold value, then the following procedures may be used. If one of the adjacent beds is thick (e.g., above the threshold thickness), the selected bed boundary may be moved toward the thick bed to increase the thickness of the layer having below the threshold thickness (the "thin bed"). If both adjacent layers are thick, the bed boundary may be moved toward the bed having lower resistivity contrast with respect to the thin bed. If both adjacent beds are thin (below the threshold thickness), remove the bed boundary with lower resistivity contrast with reference to the thin bed under examination. The foregoing process may be repeated until all the thin beds are removed from the initial estimate. If some of the layers are too thick (i.e. >3 meters), additional bed boundaries may be added as may be appropriate.

Once the bed boundaries are defined, the resistivity of a selected response (e.g., the phase response identified above) is determined at the axial middle of the beds. For each bed, such value is the initial estimated value of horizontal resistivity, Rh. An assumption may then be made about the formation dip using external information, e.g., image measurements. If no such external information is available, zero dip can be chosen as the initial estimate.

Figure 2:
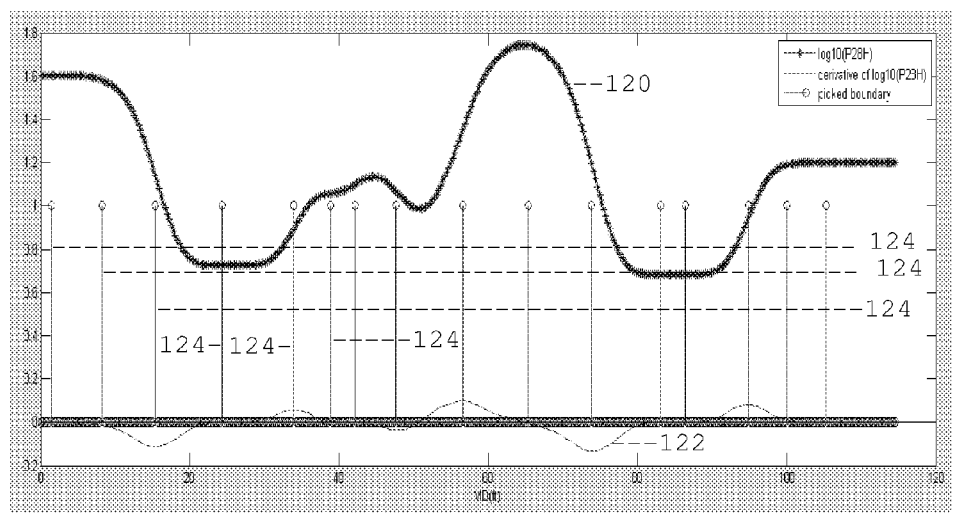
FIG. 2 shows a log(R) response.

FIG. 2 shows the log(R) response of the a 28 inch spacing phase response at curve 120 and the selected bed boundaries at 124 using the foregoing procedure. The derivative of log(R) is shown at 122 The foregoing procedure identifies all the actual bed boundaries, but it may also identify false boundaries. The estimates of bed boundary axial positions are close to the actual model positions.

FIG. 3 shows the initial formation estimate derived as explained above with reference to FIG. 2 and FIG. 3 compared with the actual formation model used. Rh, Rv and Dip values are plotted along MD ("measured depth" or axial position along the length of the wellbore). Model input values of Rh are shown at curve 126, model input Rv values are shown at curve 128, initial Rh and Rv are shown at curves 127 and 130, respectively. Model dip is shown in the second track of the log presentation at curve 132 and initial dip is shown at curve 134. Discontinuities in Rh and Rv typically indicate positions of bed boundaries. The initial estimate of Rh appears very close to the actual model value thereof. Rv and dip values, however are quite different between the initial estimate determined using the above procedure and the actual model.

Figure 3:
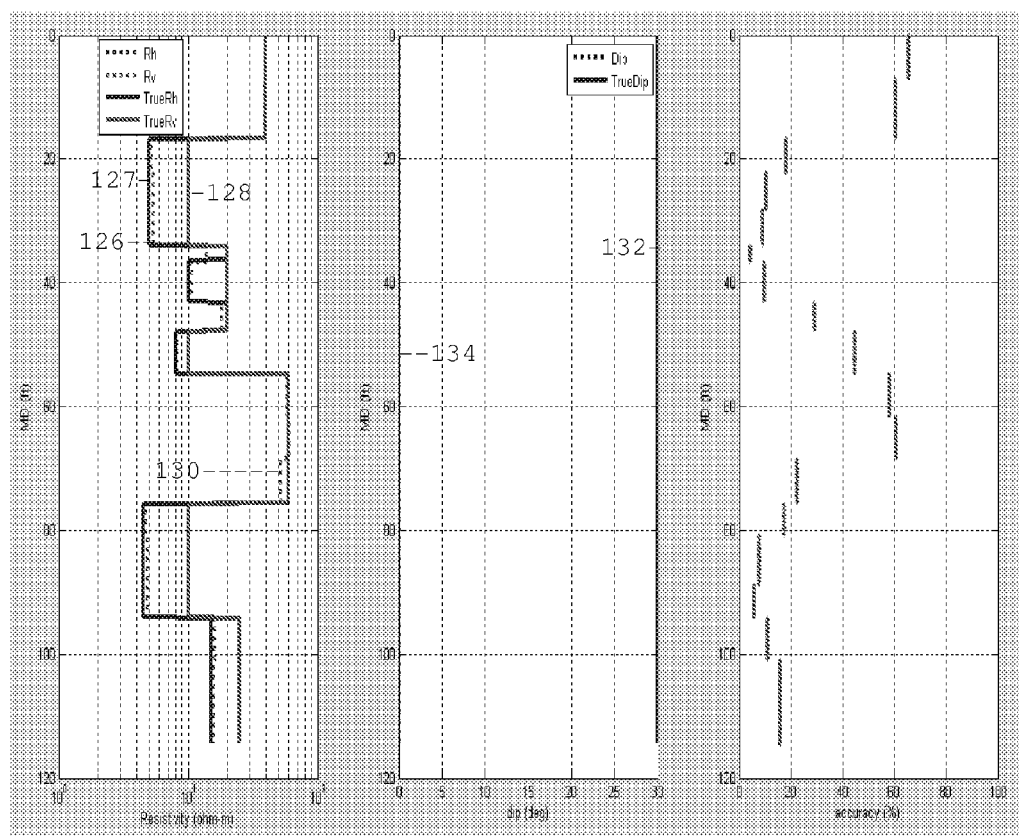
FIG. 3 shows the initial formation model compared with the true model.

In order to evaluate the difference between the initial estimate and the actual model, the following formula is proposed to describe the relative accuracy (in percent), also shown in FIG. 3 as the curve in the right hand "track." The global factor is used to define accuracy of the inverted model accuracy in this note. The global accuracy factor is defined as weighted average of Rh, Rv and dip accuracy:

$$\text{Accuracy} = 100\% - w_{Rh}\min\left(\frac{|\log 10(R_{Hmodel}/R_{Htrue})|}{Rh\_cutoff}, 1\right) -$$
$$w_{Rv}\min\left(\frac{|\log 10(R_{Vmodel}/R_{Vtrue})|}{Rv\_cutoff}, 1\right) - w_{dip}\min\left(\frac{|dip_{model} - dip_{true}|}{dip\_cutoff}, 1\right)$$

The weighting and cutoff values are determined according to the importance and tolerance error of each parameter. Convenient values are:

$$w_{Rh} = w_{Rv} = w_{dip} = \frac{1}{3}$$

$$Rh\_cutoff = \log 10(1.1)$$

$$Rv\_cutoff = \log 10(1.5)$$

$$dip\_cutoff = 5$$

Figure 4:
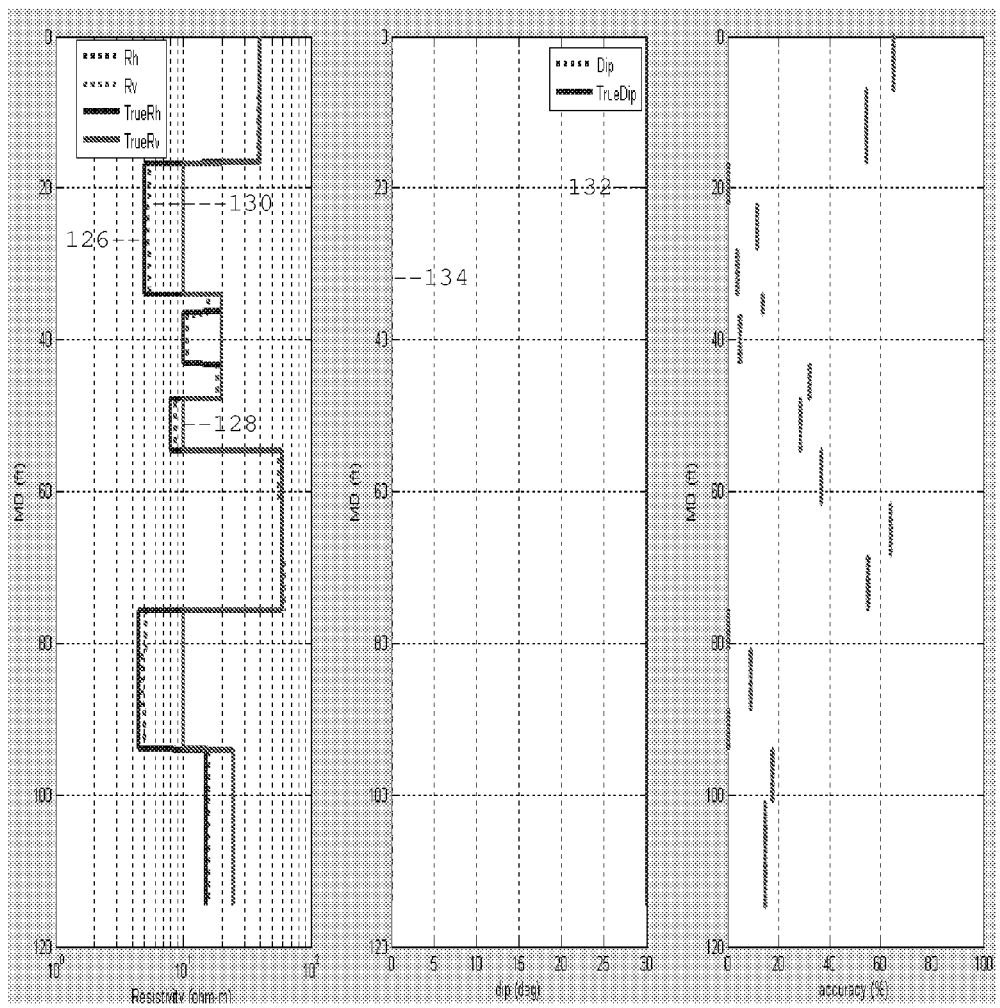
FIG. 4 shows the inversion results, inverted for Rh only.

The above outlined methodology does not include anisotropy and directional measurements, and has a limitation in that if Rh is not changing, it will not identify Rv discontinuities. Anisotropy and directional measurements (e.g., appropriate measurement channels from the PERISCOPE instrument) can be used in such cases because layer boundaries can be identified from peaks in responses that correspond to boundary crossing by a tilted or transverse magnetic dipole antenna. For optimal implementation to symmetrized directional measurements, depth shifting can be applied and performed on individual pairs of measurements 2. Invert Rh from Longitudinal Magnetic Dipole Measurements Conventional resistivity (e.g., longitudinal magnetic dipole) measurements may be used to invert for horizontal resistivities, because the response of such instruments in are primarily sensitive to horizontal resistivity, Rh, in vertical and low deviation wells (i.e., when the instrument axis is roughly perpendicular to the layers of the formation). Isotropic resistivity (Rh=Rv) can be assumed, and bed thicknesses and formation dip can be fixed. FIG. 4 shows the inverted results, using the same curve numbering notation as in FIG. 3. The Rh value has improved slightly, because the initial estimate was already very close to the actual model value. Rv and dip values are not updated in this step.

3. Invert Rv from Anisotropy Channels

Figure 5:
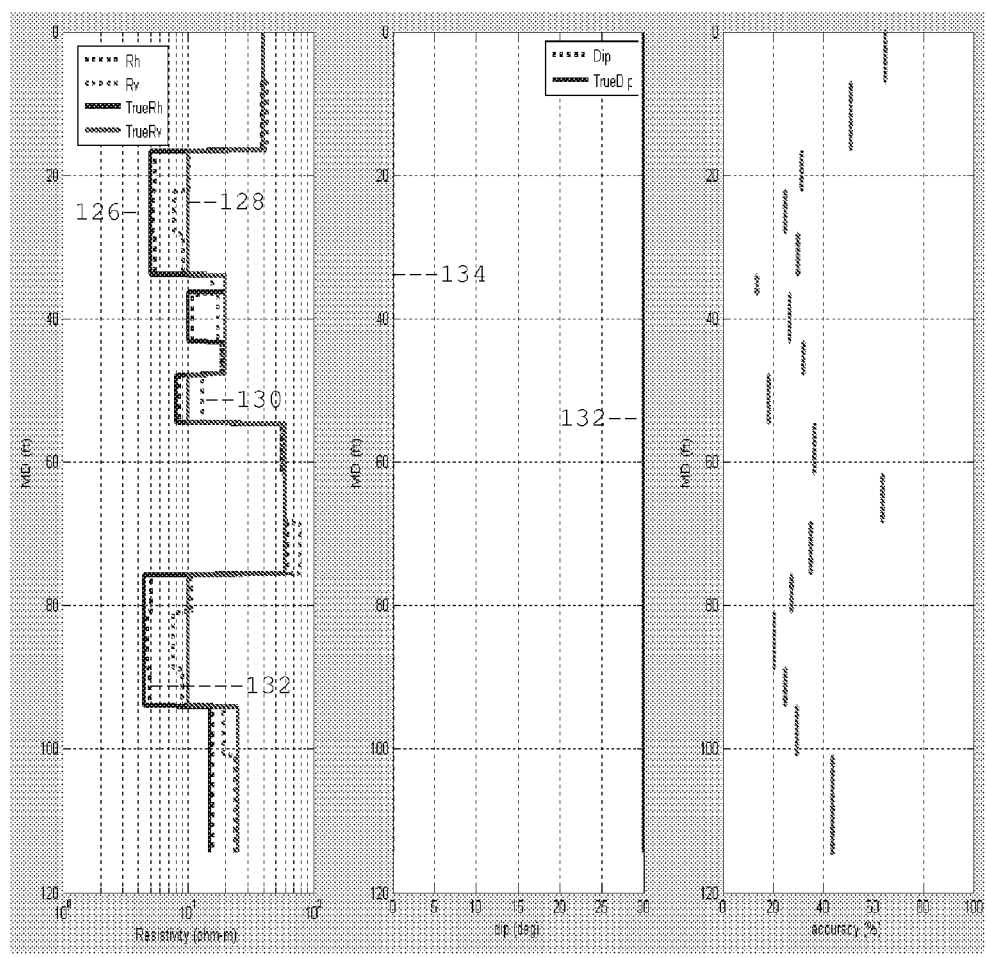
FIG. 5 shows inversion results, inverted for Rv only.

In vertical or low angle wells (or combinations of well inclination and formation dip that result in the well being substantially normal to the formation layering), anisotropy responses (e.g., tilted or transverse magnetic dipole antenna measurements) are the most sensitive to Rv. In this step they are used to invert for Rv only, fixing Rh, dip and positions of the bed boundaries from the previous step. The inverted results are shown in FIG. 5, using the same curve numbering notation as for FIGS. 3 and 4. A significant improvement in Rv values and global model accuracy can be observed.

4. Invert Rv and Dip from Directional Channels

Figure 6:
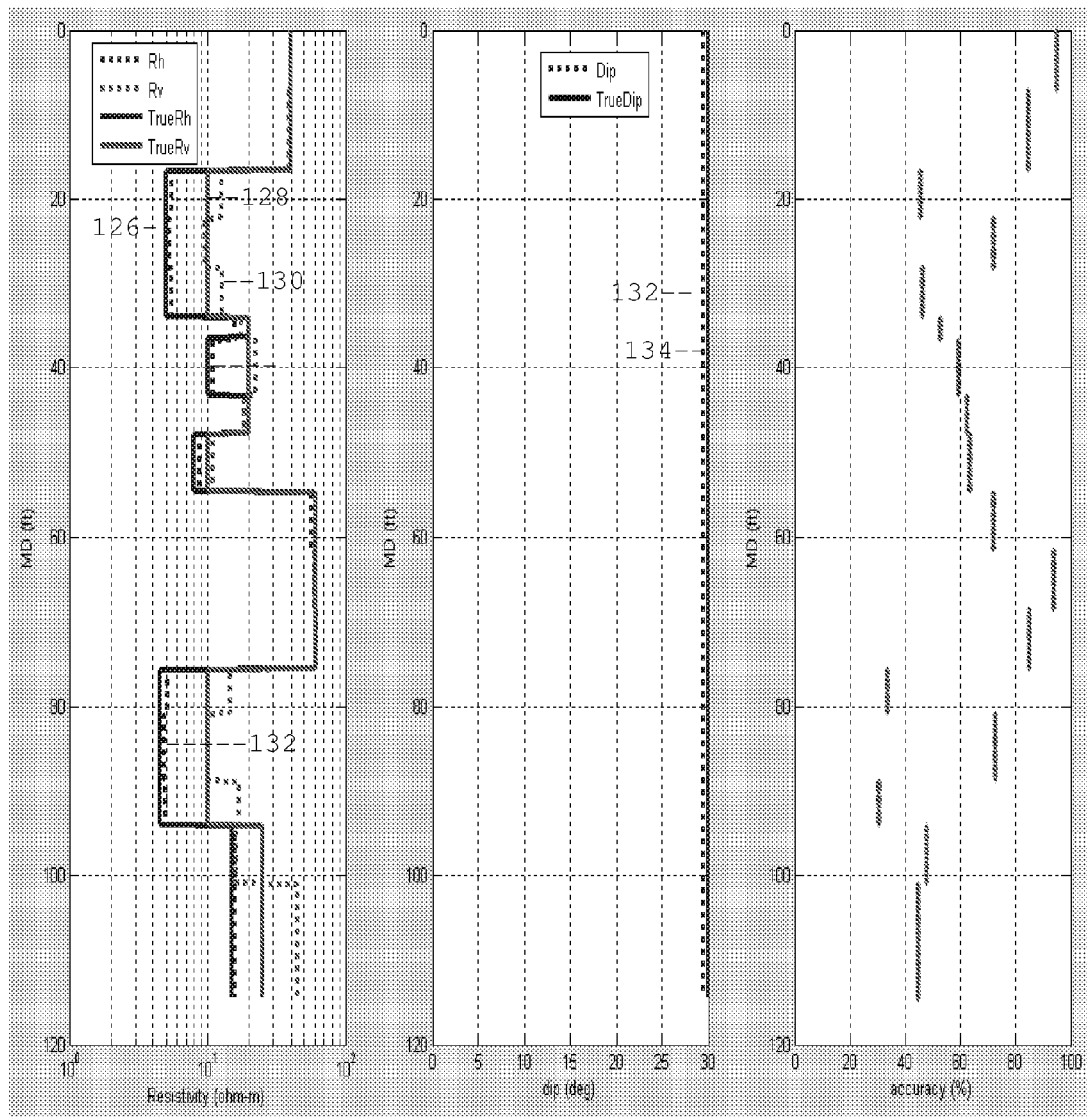
FIG. 6 shows inversion results, inverted for Rv and dip.

At non zero dip, directional (both symmetrized and antisymmetrized) measurements are also sensitive to formation dip and vertical resistivities (Rv). See, for example, U.S. Pat. No. 7,536,261 issued to Omeragic et al. and assigned to the assignee of the present invention. Therefore, these responses may be used to update Rv and dip, with Rh and positions of the bed boundaries being fixed. The results for a test example are shown in FIG. 6, using the same curve numbering notation as in FIGS. 3-5. The dip angle is observed to be very close to the modeled value. Rv is also slightly improved. The improvement in inversion output result is also reflected in the global accuracy curve.

5. Invert Rv, Dip and Bed Boundaries from all Measurements;
6. Invert Rh, Dip and Bed Boundaries from all Measurements;
7. Perturbing the Model and Restarting as Required.

After the first 4 steps are performed as explained above, the estimates of formation Rh, Rv and dip are typically already close to a final solution, and the present steps, 5 through 7, represent a "fine tuning." It is computationally the most expensive, but typically the step requires only a small number of iterations to reach convergence or minimization of a cost function.

For the test example, the results are shown in FIG. 7. The original model is reconstructed fully, so restarting the inversion after model perturbation (step 7) was not necessary. In certain cases the inversion may become "trapped" at a local minimum in the cost function. In such cases the inversion can be resumed by perturbing the final model obtained when the cost function is minimized.

Log Quality Control

Although most of the inversion techniques provide an estimate of the sensitivity of the inverted parameters to the measurement input, a reliable characterization of the uncertainty and proper log quality control is not straightforward. Therefore, no matter how well an inversion procedure is developed, knowing how much to rely on the inversion output is critical for decision making. Typically the reconstruction of the measurement by the selected model is taken as the basic indicator of how well the inversion(s) has/have converged to a solution. However, in some cases such an approach may not be sufficient, especially when inversion solutions are not unique. Therefore, the invention also provides a method which takes different key elements from to define log quality controls to enable the user to evaluate the reliability of the inversion results.

Elements for Constructing Quality Control (QC) Indicators

Three categories of elements may be considered for the purpose of constructing QC indicators, in certain exemplary embodiments: (a) model validity, (b) data fit, and (c) uncertainty of inversion parameters. Each of these is described in more detail below.

(a) Model validity (non-1D factor) is a factor describing how well the solution approximations match the actual formation properties. Usually certain approximations are made in the forward model for the purpose of simplicity. In this specific case, it is assumed that the formation is a layered medium. The final result is only reliable when such 1-D approximation is valid for the formations being evaluated.

Two exemplary factors that can be used to compute the non-1D factor are standard deviation in estimated formation dip and variation of formation azimuth angle. As to standard deviation, as previously stated, the 1-D model assumes constant formation dip within the processing window. Dip standard deviation within the processing window is a good indicator of the degree of deviation from the 1-D approximation. The dip value can be obtained from other measurements, or may be obtained by any results from the PERISCOPE instrument measurement inversion. The standard deviation of dip is calculated as:

$$dip\_std = \sqrt{\frac{1}{N} \sum_{i=-N/2}^{N/2} (dip_i - dip_{mean})^2}$$

wherein N is the number of measurement points within the processing window.

$$dip_{mean} = \frac{1}{N} \sum_{i=-N/2}^{N/2} dip_i$$

is the mean value of dip within the processing window.

A LQC indicator may be defined based on the dip standard deviation within the processing window.

$$LQC_{dip\_std} = 1 - \min\left(\frac{dip\_std}{cutoff\_dip\_std}, 1\right)^{power\_dip\_std}$$

cutoff_dip_std and power_dip_std are scaling factors determined from testing data.

As to the variation of formation azimuth angle, the apparent azimuth angle in a "top of hole" coordinate system is given by the PERISCOPE instrument measurement channel (known as DANG angle).

Similar to that defined for dip, a QC indicator related to standard deviation of DANG angle can be defined as:

$$LQC_{DANG\_std} = 1 - \min\left(\frac{DANG\_std}{cutoff\_DANG\_std}, 1\right)^{power\_DANG\_std}$$

Where DANG_std is the standard deviation of DANG values within the processing window.

cutoff_DANG_std and power_DANG_std are scaling factors (b) Data fit: Data fit is a factor describing how well the model predicted instrument responses match with the actual instrument measurements made in the rock formations. Several types of data fitting factors have been considered.

Inversion residual. Inversion residual is the cost function which the inversion is intended to minimize. The cost function is essentially a combination of data misfit for measurement used in the inversion and the regularization terms. The formulation of the cost function may be:

$$C = \sqrt{\frac{\sum_{j=1}^{n_{pos}} \sum_{i=1}^{n_{channels}} w_i^2 (H_{d,i} - H_{m,i})^2 + \text{regularization terms}}{n_{channels} \times n_{pos}}}$$

where $n_{pos}$ is the number of measurement positions within the inversion processing window, and $n_{channels}$ the number of measurement channels (number of individual measurements used in the inversion at each position.

Weighted data fitting errors for all or part of the measurement channels. Fitting errors for part or all of the available ARC or PERISCOPE instrument measurements may be defined as:

Relative error:

$$\text{misfit\_ARC} = \frac{\sum_{i \in ARC} w_i^2 (H_{d,i} - H_{m,i})^2}{\sum_{i \in ARC} \max(w_i^2 (H_{d,i})^2, 1)}$$

Absolute error:

$$\text{cost\_ARC} = \sqrt{\frac{\sum_{i \in ARC} w_i^2 (H_{d,i} - H_{m,i})^2}{n_{ARC}}}$$

Fitting errors for all or part of Symmetrized directional (D), anti-symmetrized directional (X) and anisotropy measurement channels (A):

Relative error:

$$\text{misfit\_DXA} = \frac{\sum_{i \in DXA} w_i^2 (H_{d,i} - H_{m,i})^2}{\sum_{i \in DXA} \max(w_i^2 (H_{d,i})^2, 1)}$$

Absolute error:

$$\text{cost\_DXA} = \sqrt{\frac{\sum_{i \in DXA} w_i^2 (H_{d,i} - H_{m,i})^2}{n_{DXA}}}$$

(c) Uncertainty of the inversion parameters: Uncertainty is a factor reflecting data sensitivity to the inverted parameters. Uncertainty of the inversion results due to noise in the measurement data is determined by the data sensitivity to the model parameters, as well as the inversion procedures. Direct Monte Carlo simulation is one technique for estimating inversion uncertainty and is performed by perturbing the measurements with a known noise level and performing the inversion with the perturbed measurements. After running sufficient number of realizations of the inversion, the inversion results can be analyzed statistically. The standard deviation of the inversion results can be used to define the inversion uncertainty It is usually not practical to run a large number of inversions duo to the speed requirement, especially for real time application. In this case a fast approximate approach is used to estimate from deterministic inversion using the model covariance matrix. See, Habashy, T., Abubakar, A., 2004, "*A general framework for constraint minimization for the inversion of electromagnetic measurements*," Progress in Electromagnetics Research (PIER), 46, p. 265-312.

Constructing QC Using Basic QC Elements:

The 3 categories of QC elements described above may be combined to define inversion quality for Rh, Rv, Dip, Azimuth as well as the global quality.

Quality of Rh: Combining Rh uncertainty $R_{h\_unc}$, inversion residual $\Psi$, data fitting for ARC (or PERISCOPE) misfit_ARC and cost_ARC Formulation from misfit ("relative error"):

$$LQC_{Rh1} = \left(1 - \min\left(\frac{R_{h\_unc} \times C \times \text{misfit\_ARC}}{R_h \times \text{cutoff}_{Rh\_unc\_misfit}}, 1\right)\right)^{power\_misfit\_ARC}$$

Formulation from absolute error (in high resistivity situation):

$$LQC_{Rh2} = \left(1 - \min\left(\frac{\min(R_{h\_unc} \times C, 10) \times \text{cost\_ARC}}{R_h \times \text{cutoff}_{Rh\_unc\_cost}}, 1\right)\right)^{power\_misfit\_ARC}$$

The final Rh quality $$LQC_{Rh} = \max(LQC_{Rh1}, LQC_{Rh2})$$

Quality of Rv: Combining Rv uncertainty $R_{v\_unc}$, inversion residual $\chi$, data fitting for directional and anisotropy channels (misfit_DXA and cost_DXA Formulation from relative errors:

$$LQC_{Rv1} = \left(1 - \min\left(\frac{R_{v\_unc} \times C \times \text{misfit\_DXA}}{R_v \times \text{cutoff}_{Rv\_unc\_misfit}}, 1\right)\right)^{power\_misfit\_DXA} LQC_{dip\_std}$$

Formulation from absolute errors:

$$LQC_{Rv2} = \left(1 - \min\left(\frac{\min(R_{v\_unc} \times C, 10) \times \text{cost\_DXA}}{R_v \times \text{cutoff}_{Rv\_unc\_cost}}, 1\right)\right)^{power\_misfit\_DXA} LQC_{dip\_std}$$

Final Rv quality:

$$LQC_{Rv} = \max(LQC_{Rv1}, LQC_{Rv2})$$

LQC for true dip: Combining dip uncertainty $dip_{true\_unc}$, inversion residual C, data fitting for directional and anisotropy channels (misfit_DXA and cost_DXA)

Formulation from relative error:

$$LQC_{true\_dip1} = \left(1 - \min\left(\frac{dip_{true\_unc} \times C \times \text{misfit\_DXA}}{\text{cutoff}_{true\_dip\_unc\_misfit}}, 1\right)\right)^{power\_misfit\_DXA}$$

Formulation from absolute error:

$$LQC_{true\_dip2} = \left(1 - \min\left(\frac{dip_{true\_unc} \times C \times \text{cost\_DXA}}{\text{cutoff}_{true\_dip\_unc\_cost}}, 1\right)\right)^{power\_misfit\_DXA}$$

Final dip quality:

$$LQC_{true\_dip} = \begin{cases} \max(LQC_{true\_dip1}, LQC_{true\_dip2}) LQC_{dip\_std} & dip_{app} < 2° \\ \max(LQC_{true\_dip1}, LQC_{true\_dip2}) LQC_{dip\_std} LQC_{DANG\_std} & \text{else} \end{cases}$$

DANG angle variation effect should be removed in vertical cases.

LQC for true dip azimuth: Combining azimuth uncertainty $azi_{true\_unc}$, inversion residualC, data fitting for directional and anisotropy channels (misfit_DXA and cost_DXA)

Formulation from relative error:

$$LQC_{true\_azi1} = \left(1 - \min\left(\frac{azi_{true\_unc} \times C \times \text{misfit\_DXA}}{cutoff_{true\_azi\_unc\_misfit}}, 1\right)^{power\_misfit\_DXA}\right)$$

Formulation from absolute error:

$$LQC_{true\_azi2} = \left(1 - \min\left(\frac{azi_{true\_unc} \times C \times \text{cost\_DXA}}{cutoff_{true\_azi\_unc\_cost}}, 1\right)^{power\_misfit\_DXA}\right) LQC_{dip\_std} LQC_{DANG\_std}$$

Final formulation:

$$LQC_{true\_azi} = \begin{cases} \max(LQC_{true\_azi1}, LQC_{true\_azi2}) LQC_{dip\_std} & \text{if } dip_{app} < 2° \\ \max(LQC_{true\_azi1}, LQC_{true\_azi2}) LQC_{dip\_std} LQC_{DANG\_std} & \text{else} \end{cases}$$

Global confidence level is a combination Rh, Rv, Dip and azimuth confidences.

$$LQC_{global} = (w_{rh} LQC_{Rh} + w_{rv} LQC_{Rv} + w_{dip} LQC_{true\_dip} + w_{azi} LQC_{true\_azi})/(w_{rh} + w_{rv} + w_{dip} + w_{azi})$$

$w_{rh} = w_{rv} = w_{dip} = w_{azi} = 1$ in general.

$w_{dip} = w_{azi} = 0$ if $\max(R_h, R_v)/\min(R_h, R_v) \leq 1.1$

Dip and azimuth effect may be discounted in cases of isotropic and homogeneous rock formations.

All scaling factors and weighting factors are obtained based on both the inversion of realistic synthetic models (with electronics and environmental noise included) and inversion of field data.

The resulting qualities may all be ranged from 0 to 1. The values may be converted into a color map in which the color gradually changes from red to green as the quality values increases from 0 to 1. In general green indicates good quality and red color will initiate an alert to the system operator. Any other type of display may be used to indicate the quality as well as color, such as a curve scaled between zero and unity and displayed with respect to depth.

$$\text{Confidence} = 100\% - w_{seg}\frac{\text{seg\_mismatch}}{\text{seg\_cutoff}} + w_{pbp}\frac{\text{pbp\_mismatch}}{\text{pbp\_cutoff}} +$$

$$w_{AT}\frac{\text{AT\_error\_max}}{\text{AT\_cutoff}} + w_{PS}\frac{\text{PS\_error\_max}}{\text{PS\_cutoff}} + w_{dip}\frac{\text{dip\_std}}{\text{dip\_std\_cutoff}}$$

$w_{seg} = w_{pbp} = \frac{1}{3.1}$, $w_{AT} = w_{PS} = \frac{0.3}{3.1}$, $w_{dip} = \frac{0.5}{3.1}$ seg_cutoff = pbp_cutoff = 10%, AT_cutoff = 0.5 dB, PS_cutoff = 10°, dip_std_cutoff = 5°

Figure 8:
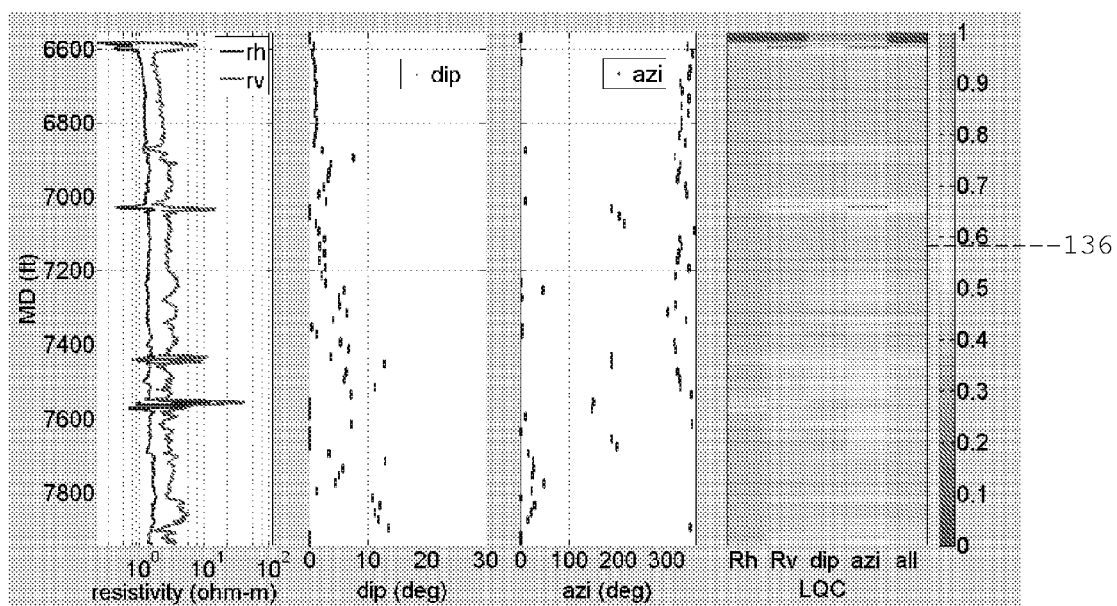
FIG. 8 shows inversion quality control graphs.
Figure 9C:
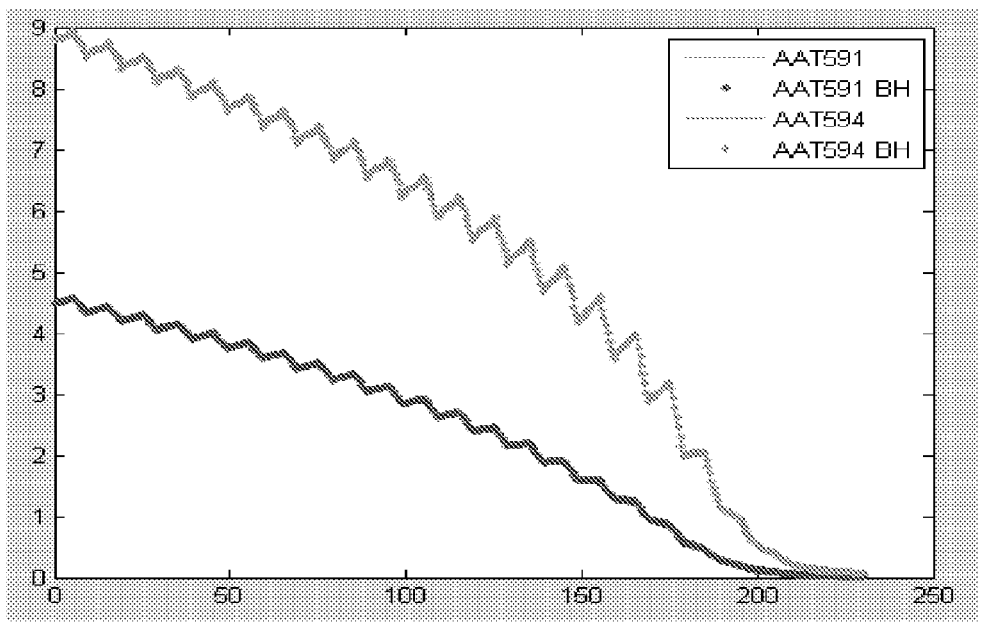
Figure 9D:
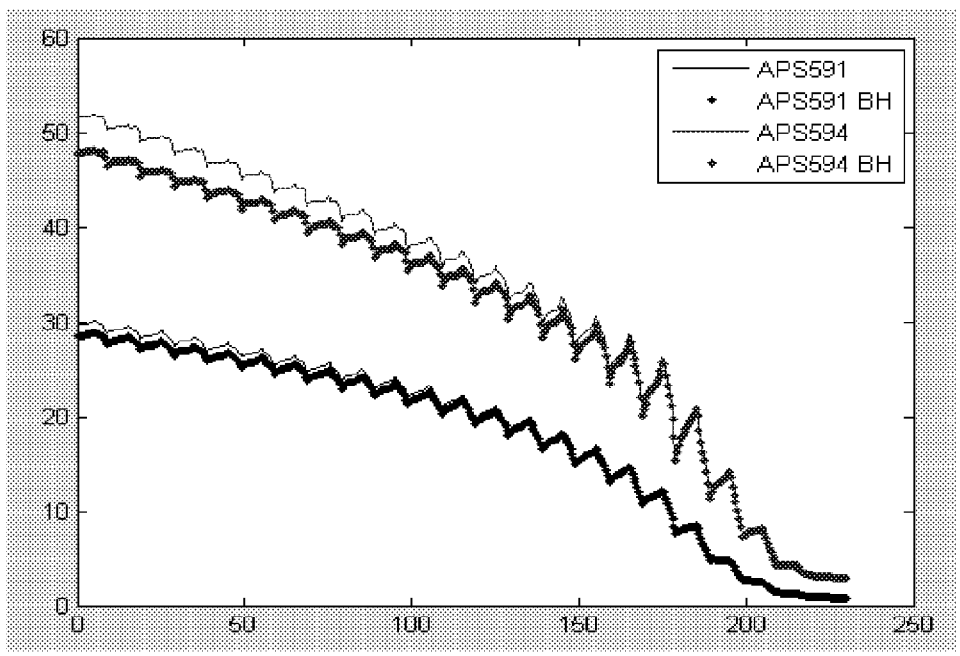

FIG. 8 shows a field data example. The first three tracks shows the inverted formation model parameters Rh, Rv, Dip, Azimuth. The last track shows the QC (quality control) for Rh, Rv, Dip, azimuth and the overall inversion quality. At some depths the inversion encountered some difficulties. At such depths the Rh and Rv curves showed some spikes and the quality was relatively low. For some regions (i.e. between 7200 to 7400 ft) the inverted dip and azimuth showed some reduced QC (indicated by yellow on the color map, or reductions in the Global Confidence color map 136 for example) but the determined Rh and Rv are still very reliable. The Global Confidence may be presented in the form of a color or gray scale map or a curve at the discretion of the system designer or user.

Dealing with Borehole Effect

In the forward model the borehole effect is typically ignored for simplicity. In some cases the borehole effect may be significant and neglecting the borehole effect may lead to inaccurate inversion results. One technique for managing borehole effect is to exclude the measurements that have large borehole effect, and perform the inversion with measurements that have more limited borehole effect (typically those having larger transmitter to receiver spacing), or conversely, excluding from the inversion procedure those responses from relatively short spaced transmitter/receiver combinations.

Figure 10:
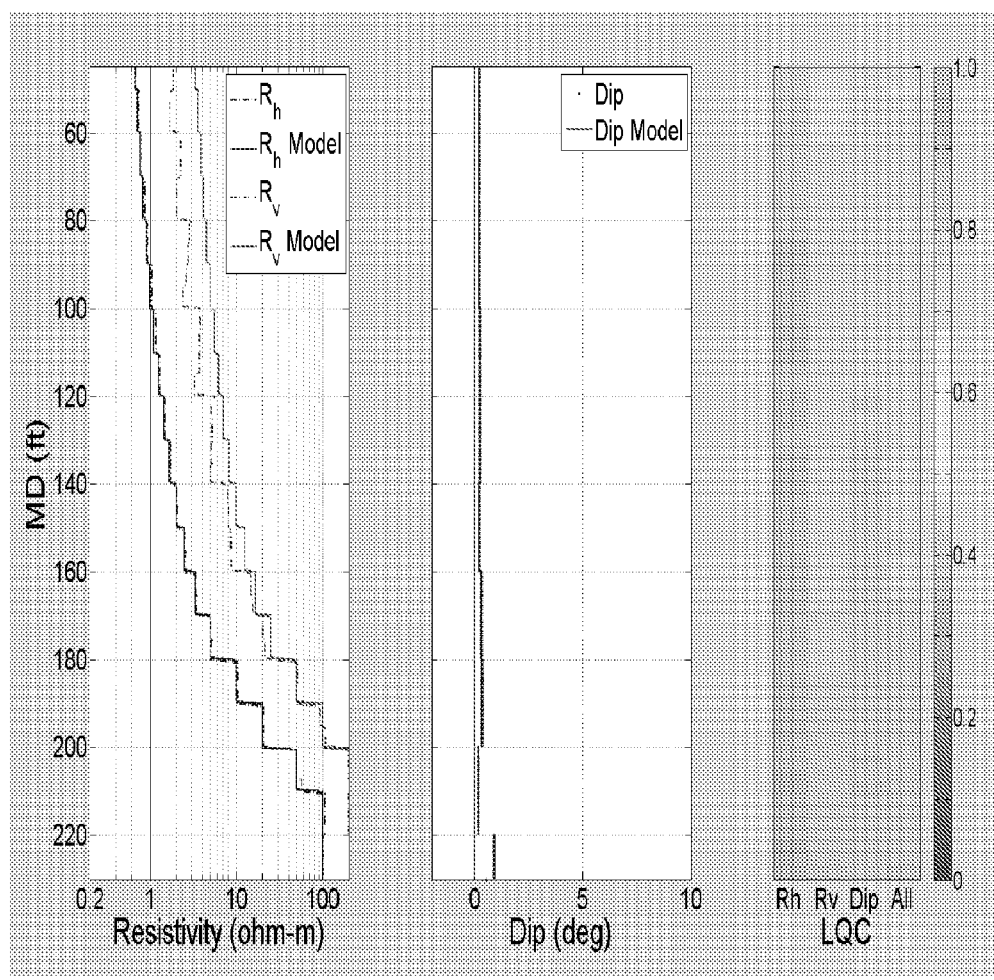
FIG. 10 shows inversion results.
Figure 11:
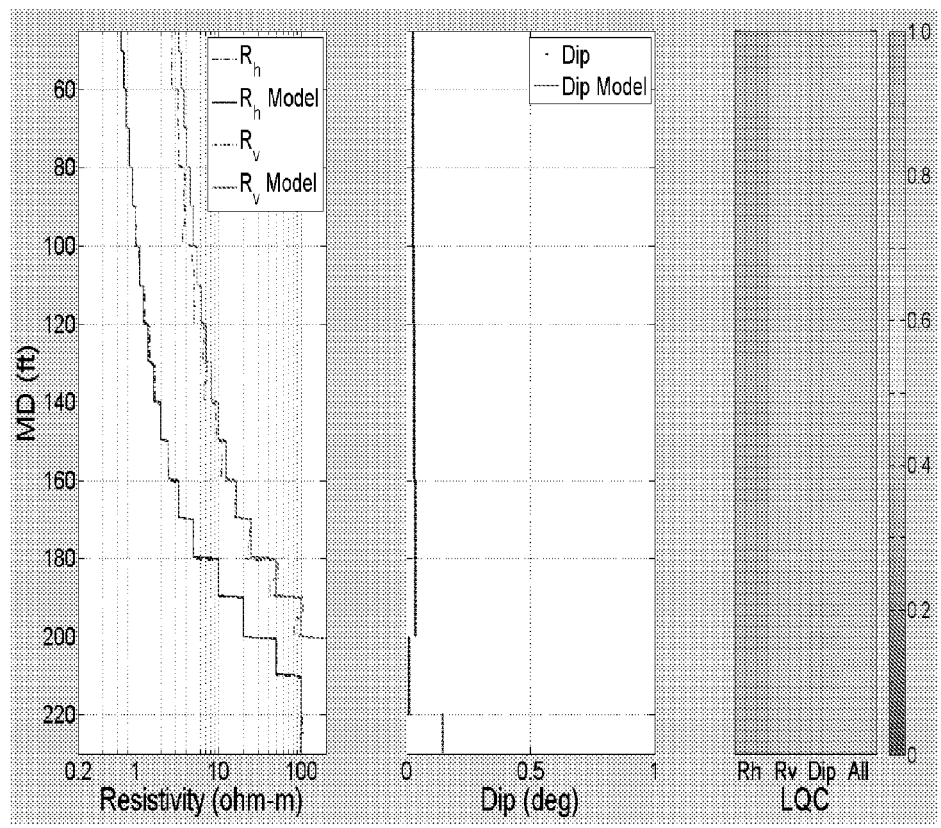
FIG. 11 shows inversion results with reduced borehole effect.

FIGS. 9A through 9D show a synthetic example, comparing tool responses with and without large borehole effect. In this case borehole effect is small for most channels except for the curves marked DPS964 and APS594, which are reflect response of relatively short spaced transmitter-receiver combinations. FIG. 10 shows the inversion results when curves DPS964 and APS594 are included. The inverted Rv is substantially different from the Rv model value. In order to reduce the borehole effect on inversion, response curves DPS964 and APS594 were excluded from the inversion, and the new results are shown in FIG. 11. The inversion results are much closer to the model values.

Methods according to the invention may provide faster inversion results than methods used for wireline triaxial induction, thus making possible calculation of inversion results substantially in real time during drilling a wellbore, if so desired.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for determining formation resistivity, anisotropy and dip from wellbore measurements, comprising:

moving a well logging instrument through subsurface formations, the instrument including electromagnetic transmitters and receivers oriented as longitudinal magnetic dipoles and at least one of tilted magnetic dipoles and transverse magnetic dipoles, the transmitters and receivers used to make corresponding dipole sensitive measurements;

determining formation layer boundaries and horizontal resistivities of the formation layers from the longitudinal magnetic dipole measurements;

determining vertical resistivities of the formation layers by inversion of anisotropy sensitive electromagnetic measurements;

determining improved vertical resistivities of the formation layers and dips thereof by inverting symmetrized and anti-symmetrized electromagnetic measurements;

determining improved vertical resistivities, improved layer boundaries and improved dips by inversion of the longitudinal magnetic dipole, anisotropy sensitive, symmetrized and anti-symmetrized measurements; and determining improved horizontal resistivities, further improved layer boundaries and further improved dips by inversion of the longitudinal magnetic dipole, anisotropy sensitive, symmetrized and anti-symmetrized measurements.

2. The method of claim 1 further comprising the steps of:

perturbing at least one of the improved vertical resistivities, further improved horizontal resistivities, further improved layer boundaries and further improved dips, and repeating the steps of:

determining improved vertical resistivities, improved layer boundaries and improved dips by inversion of the longitudinal magnetic dipole, anisotropy sensitive, symmetrized and anti-symmetrized measurements; and determining improved horizontal resistivities, further improved layer boundaries and further improved dips by inversion of the longitudinal magnetic dipole, anisotropy sensitive, symmetrized and anti-symmetrized measurements until differences between the output of the inversion of the longitudinal magnetic dipole, anisotropy sensitive, symmetrized and anti-symmetrized channel responses and the measured response of the well logging instrument fall below a selected threshold.

3. The method of claim 1 further comprising calculating a global accuracy value for the determined improved horizontal resistivities, further improved vertical resistivities, further improved layer boundaries and further improved dips.

4. The method of claim 3 wherein the global accuracy comprises a weighted average accuracy of the determined improved horizontal resistivities, further improved vertical resistivities and further improved dips.

5. The method of claim 1 further comprising reducing the effects of wellbore conductivity by excluding from all the determining steps responses of electromagnetic measurements affected by the wellbore size and conductivity, with borehole signal above defined threshold value.

6. The method of claim 1 further comprising determining a quality factor for each of the determined improved horizontal resistivities, further improved vertical resistivities and further improved dips.

7. The method of claim 6 further comprising presenting the quality factor as at least one of a color map, a gray scale map and a curve.

8. The method of claim 6 wherein the quality factors are defined by model validity, data fit and uncertainty of parameters used in inversion.

9. The method of claim 8 wherein the quality factors are used to define a confidence level for the result of the determining improved horizontal resistivities, further improved vertical resistivities and further improved dips.

10. The method of claim 6 further comprising calculating a standard deviation of dip values.

11. The method of claim 6 further comprising calculating a standard deviation of dip azimuth values.

12. The method of claim 6 wherein the quality factor includes calculating inversion residuals.

13. The method of claim 6 wherein the quality factor includes calculating data fit errors.

14. The method of claim 6 wherein the quality factor includes calculating inversion parameter uncertainties.

* * * * *